(12) United States Patent
Ryan (10) Patent No.: US 9,753,310 B2
(45) Date of Patent: Sep. 5, 2017

(54) METHOD FOR PRODUCING A POLARIZED EYEWEAR

(71) Applicant: Carl Zeiss Vision International GmbH, Aalen (DE)

(72) Inventor: Ben Ryan, Port Noarlunga South (AU)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/082,392

(22) Filed: Mar. 28, 2016

(65) Prior Publication Data

US 2016/0282637 A1    Sep. 29, 2016

(30) Foreign Application Priority Data

Mar. 26, 2015   (EP) ..................................... 15161051

(51) Int. Cl.
| | |
|---|---|
| *G02C 7/12* | (2006.01) |
| *G02C 7/10* | (2006.01) |
| *G02B 1/08* | (2006.01) |
| *G02B 1/04* | (2006.01) |
| *B29D 11/00* | (2006.01) |

(52) U.S. Cl.
CPC .......... *G02C 7/12* (2013.01); *B29D 11/00432* (2013.01); *B29D 11/00644* (2013.01); *G02B 1/041* (2013.01); *G02B 1/08* (2013.01); *G02C 7/105* (2013.01); *G02C 7/108* (2013.01); *G02C 2202/16* (2013.01)

(58) Field of Classification Search
CPC .......... G02C 7/12; G02C 7/105; G02C 7/108; B29D 11/00432; B29D 11/00644; G02B 1/041; G02B 1/08
See application file for complete search history.

(56) References Cited

U.S. PATENT DOCUMENTS

| | | | |
|---|---|---|---|
| 8,172,393 B2 | 5/2012 | Tendler | |
| 2008/0094549 A1 | 4/2008 | Sadamitsu | |
| 2009/0134397 A1* | 5/2009 | Yokoi | H01L 27/1214 257/72 |
| 2010/0296039 A1* | 11/2010 | Zhao | G02F 1/133753 349/129 |
| 2011/0310481 A1* | 12/2011 | Kwon | G02B 5/3033 359/487.02 |
| 2013/0329184 A1 | 12/2013 | Barzak et al. | |
| 2016/0252660 A1* | 9/2016 | Matsuno | G02B 5/3033 |

OTHER PUBLICATIONS

Extended search report of the European Patent Office dated Jul. 29, 2015 in European patent application 15161051.6 on which the claim of priority is based.

* cited by examiner

*Primary Examiner* — Duy Deo
(74) *Attorney, Agent, or Firm* — Walter Ottesen, P.A.

(57) ABSTRACT

A method for producing polarized eyewear is disclosed, which includes providing a polarizing film or a blank of the eyewear having a polarizing film, whereby the polarizing film is made of a substrate film and a polarizing agent; dipping the polarizing film or the blank with the polarizing film into a solvent; and dissolving the polarizing agent from the polarizing film.

18 Claims, 5 Drawing Sheets

FIG.5 cross – section A-A'

METHOD FOR PRODUCING A POLARIZED EYEWEAR

CROSS REFERENCE TO RELATED APPLICATION

This application claims priority of European patent application no. 15161051.6, filed Mar. 26, 2015, the entire content of which is incorporated herein by reference.

FIELD OF THE INVENTION

The present disclosure relates to a method for producing a polarized eyewear, in particular polarized eyeglasses and more particularly polarized spectacle lenses, shields and/or sunglasses.

BACKGROUND OF THE INVENTION

Polarized sunglasses have been used for many years to filter out reflections and in general to sharpen the viewed images of the surrounding scene. The polarization not only provides glare protection but also in some cases attenuates the overall light level such that the polarized sunglasses function not only as polarization lenses but also as light attenuating lenses.

U.S. Pat. No. 8,172,393 B2 by Tendler describes a lens that has an upper polarized portion and a lower unpolarised portion. The polarized upper portion of the lens provides glare protection and as the case may be increased light intensity protection. The unpolarised lower portion of the lens enables the wearer to view polarized displays, for example instruments in a car or aircraft cockpit.

This patent relates to a product patent with little information regarding how to manufacture this gradient polarization. In column 4, lines 51 to 55, of U.S. Pat. No. 8,172,393 B2, Tendler proposes that "Gradient polarization may be accomplished in a number of ways, one of which being the stretching of polarization layers to provide the gradient. Another way is to provide adjacent stripes of polarization material of different polarization densities." These proposals are applicable; however, they may be expensive, in particular on a low number scale, or inadequate if to be adjusted to individual wearer's needs.

A polarizer is an optical filter that passes light of a specific polarization and blocks waves of other polarizations. It can convert a beam of light of undefined or mixed polarization into a beam with well-defined polarization, i.e., polarized light. The common types of polarizers are linear polarizers and circular polarizers. Polarizers are used in many optical techniques and instruments, and polarizing filters find applications not only in eyewear but also in photography and liquid crystal display technology. Polarizers can also be made for other types of electromagnetic waves besides light, such as radio waves, microwaves, and X-rays.

Linear polarizers can be divided into two general categories: absorptive polarizers, where the unwanted polarization states are absorbed by the device, and beam-splitting polarizers, where the unpolarized beam is split into two beams with opposite polarization state.

A plurality of absorptive polarizers are known. Certain crystals, due to the effects described by crystal optics, show dichroism, preferential absorption of light which is polarized in particular directions. They can therefore be used as linear polarizers. The best known crystal of this type is tourmaline. However, this crystal is seldom used as a polarizer, since the dichroic effect is strongly wavelength dependent and the crystal appears colored. Herapathite is also dichroic, and is not strongly colored, but is difficult to grow in large crystals.

Well known among polarizing films is in particular the Polaroid® polarizing filter. A Polaroid® polarizing filter functions similarly on an atomic scale to a wire-grid polarizer. It was originally made of microscopic herapathite crystals. Its current H-sheet form is made from polyvinyl alcohol (PVA) plastic with an iodine doping. Stretching of the sheet during manufacture causes the PVA chains to align in one particular direction. Valence electrons from the iodine dopant are able to move linearly along the polymer chains, but not transverse to them. So incident light polarized parallel to the chains is absorbed by the sheet; light polarized perpendicularly to the chains is transmitted.

In the meantime a plurality of polarizing films being derived from the original Polaroid® polarizing filter are known. Such polarizing films may roughly be divided into two types: iodine-type films with superior optical characteristics and dye-type films with superior heat-resistant characteristics.

The production of such a polarizing film is derived from the Polaroid® process. The polarizing film is either made by dyeing a substrate film of an in general polymeric material (mainly polyvinyl alcohol (PVA)) or by iodine being adsorbed onto its surface, then stretching and orientating the film. This gives the film polarization characteristics that allow only light with a certain oscillation direction to pass through it. Furthermore, in order to secure mechanical strength of the film, backing materials such as a triacetyl cellulose (TAC) film or a protective film are laminated to the polarizing film.

Examples for substrate films and dyes are for example disclosed in United States patent application publication 2008/0094549 A1.

The predominantly used material for substrate films is polyvinyl alcohol. Polyvinyl alcohol (PVOH, PVA, or PVA1) is a water-soluble synthetic polymer. It has the idealized formula $[CH_2CH(OH)]_n$. It is used in papermaking, textiles, and a variety of coatings. It is white (colorless) and odorless.

The polarizing film may be given various kinds of treatment. The film itself may also be required to have functions to control reflection, stain and light leakage. Some types of liquid crystal displays (LCDs), touch panels, or organic electroluminescence (EL) displays also require a product made by laminating a retardation film to the polarizing film.

The durability and practicality of a Polaroid® type polarizing filter makes it the most common type of polarizer in use, for example for sunglasses, photographic filters, and liquid crystal displays. It is also much cheaper than other types of polarizers.

SUMMARY OF THE INVENTION

Disclosed herein is a method for producing polarized eyewear with an unpolarised section, or a gradient of dichroism, such that it is possible for the wearer of the eyewear to read electronic instruments such as speedometers having digital/LCD/polarized displays without taking off the polarized eyewear. Preferably, the production process is conducted in an inexpensive manner.

The disclosure is based on the assumption that any manufacturing process will likely require providing different polarization densities or gradient tinting at the time of manufacture. Pre-formed PVA polarized films for example can be purchased already cut and formed from film suppliers supplying to lens casters. This competition has lowered the cost of films significantly. For those companies without the ability to make polarized films, and/or the know-how and financial resources required to manufacture a gradient polarized film, a more convenient and inexpensive method to generate a gradient polarizer would be to modify the preformed PVA films from suppliers. All PVA films cheaply purchased from various suppliers could be potentially bleached to give a region of the film that is non-polarized. This could be either a defined region or a gradient across the lens.

Current gradient polarized products do not give rise to gradient dichroism because a light polarizer is usually cast into a thermoset lens and then the polarized lens itself is tinted with non-dichroic (non-polarised) dyes to give an overall gradient tint. However, this approach does not allow the wearer to see polarized displays et cetera. Additionally these tinting methods must be modified individually to suit the lens material used. This means a prescription lab must be able to have methods in place to deal with this. Using gradient tinted polarised lenses removes this complexity for the prescription labs.

Additionally, in particular PVA is typically manufactured as a flat sheet. Various methods to generate a gradient polarizer during the manufacturing process will likely need to be done on the flat sheet first prior to stretching and/or shaping of the film containing the gradient into a curve to suit a lens. This may give rise to distortion of the gradient. Performing the leaching on an already curved film should then provide a better control over the process.

Therefore, the method for producing polarized eyewear according to the disclosure comprises:
  providing a polarizing film (without a blank) or providing a blank of the eyewear comprising a polarizing film, whereby the polarizing film includes a substrate film and a polarizing agent; and,
  dipping the polarizing film (without a blank) or the blank comprising the polarizing film into a solvent dissolving the polarizing agent from the polarizing film.

A blank of the eyewear in this context means a non-finished product to generate an eyewear such as a spectacle lens or a sunglass lens therefrom. The blank may be semi-finished having one surface, namely either the surface being defined and determined to face the wearer's eye or the surface being defined and determined to be located opposite to the surface facing the wearer's eye, that is, the surface being defined and determined to face the object, being optically finished and the opposite surface having to be machined in order to comply to the wearer's needs.

The blank may be fabricated from one of the following materials being in general known under their trade names: CR-39 Hard Resin, PPG Trivex, SOLA Spectralite, Essilor Ormex, Polycarbonate, MR-8 1.6 Plastic, MR-6 1.6 Plastic, MR-20 1.6 Plastic, SOLA Finalite, MR-7 1.665 Plastic, MR-7 1.67 Plastic, MR-10 1.67 Plastic, et cetera.

The polarizing film may be applied, for example laminated, onto one of the blank's surfaces, namely the surface intended to face the wearer's eye or the surface intended to face the surface opposite to the wearer's eye. The polarizing film may also be sandwiched between two half blanks.

A substrate film in the context of the present disclosure means a carrier for the polarizing agent either by being impregnated by the polarizing agent or by being coated with the polarizing agent or both.

Dipping means in particular bringing into contact with the solvent in liquid or as the case may be gaseous form.

Polarizing agent means any substance being capable of providing polarizing, in particular linearly polarizing properties to the film by adequate treatment. The polarizing agent may have, in addition to its inherent intensity attenuating properties removing light with a particular oscillation direction, intensity attenuating properties for the transmitted fraction.

The problem indicated above is completely solved by the foregoing technique.

It is noted that the polarizing film may in addition to the polarizing agent comprise a light attenuating agent and/or a photochromic agent and/or a coloring agent.

Preferably, the substrate film consists of or comprises at least one substance of the group: polyvinyl alcohol or a derivative thereof or a polyene type film obtained by dehydrochlorinating a polyvinyl chloride film or dehydrating a polyvinyl alcohol film to produce polyene. All of the above substances are quite inexpensive and therefore suitable as a base material to produce eyewear at low cost but high quality.

It is advantageous if the polarizing agent consists of or comprises at least one member of the group consisting of: iodine and a dichroic dye. It is well known how to produce polarizing films based on a plurality of representatives of these substances. A multiplicity of these substances is suitable to fabricate polarizing films at low price but high quality as indicated in the introductory part of the present disclosure.

Typical dichroic dyes consist of or comprise at least one compound of the group: an azo-compound bearing the functional group R–N=N–R', in which R and R' can be either aryl or alkyl; a naphtha-compound; or an anthraquinone-compound. Fabrication processes for polarizing films from such materials are well-established.

In case the polarizing film comprises a light attenuating and/or a coloring agent, these agents may consist of or comprise respective coloring dyes. Respective light attenuating and/or coloring dyes may also consist of or comprise at least one compound of the group: an azo-compound bearing the functional group R—N=N—R', in which R and R' can be either aryl or alkyl; a naphtha-compound; or an anthraquinone-compound.

It is advantageous if the solvent comprises a polar agent since in general these dyes have an increased solubility for polar agents. In addition, the substrate material may also show significant solubility for polar agents increasing the leach out velocity.

Experiments based on dye-type PVA polarizers using water or alcohol or acetone as the solvent agent show a significant leach out of the dichroic dye from the film after a fairly short time. Polarised dyes appear to come out of the film to leave a lighter portion of the film that has noticeably less polarization. PVA for example is hygroscopic such that in particular even water penetrates the PVA to dissolve the dyes. With presently conducted experiments dyes have not been able to be completely removed without destroying the polarizing film; however, noticeable removal of dyes to lower the polarizing efficiency can be achieved while maintaining the integrity of the film such that the film may be cast into an eyewear. Processes for casting an eyewear such as, for example, a spectacle lens are disclosed for example in U.S. Pat. No. 8,172,393 B2 and the references mentioned therein.

The dyes can be seen to be leaching out and appear to accumulate in the solvent, in particular water if used as a solvent.

A plurality of treatments are suitable to remove the dyes without destroying the film. In particular sonication, use of a plasticizer common to, for example, PVA added into water as solvent to prevent film cracking, common water chlorination techniques to chemically bleach rather than dissolve dyes, detergents; and, use of chelating compounds to extract dyes are such techniques.

Additionally, chemically modifying the dyes (for example with the aid of a mordant the dyes may be made water insoluble), may allow the dyes to be dissolved with non-polar, in particular non-water solvents, of which the substrate films such as PVA films are inert to.

Therefore, alternatively or as the case may be in addition to the polar agent, the solvent may comprise a non-polar agent. Using a non-polar agent is suitable in particular in case the dichroic dye and/or the substrate film is (chemically) modified to reduce in particular its water solubility.

According to an advantageous embodiment, the method may in addition include that the non-polar agent consists of or comprises at least one compound of the group: $C_nH_n$ and/or $C_nH_{n+2}$ with n being an integer; toluene; chloroform; diethyl ether. Such substances are well-known non-polar solvents.

Additionally, it has been found that the preferred temperature of the solvent during the dipping step is between 10° C. and 40° C. More preferably, the temperature may be kept between 15° C. and 39° C. or even more preferably between 18° C. and 38° C. A balance between dye-removing velocity, solvent resistivity of the substrate film and reproducibility has to be found. It has been found that, for example, PVA as a substrate film starts to dissolve in water as a solvent at a temperature of approximately 38° C. Therefore, the temperature has to be kept preferably well below this temperature.

The duration of the dipping step is preferably kept between 1 min and 350 min, more preferably between 10 min and 250 min. It has been found that the best results were achieved for dipping periods between 15 min and 200 min or even more preferably between 20 min and 150 min.

A compromise with respect to duration for the dipping step and temperature of the solvent during the dipping step is the following: The temperature of the solvent during the dipping step is kept between 15° C. and 38° C. and the duration of the dipping step is kept between 30 min and 250 min. Pre-conditioning of the polarizing film or the blank with the polarizing film by increasing its temperature to or even above the temperature of the solvent prior to dipping reduces the duration of the dipping step significantly.

In order to produce graded polarization the depth of immersion of the blank into the solvent may be varied during the dipping step. This may be conducted by repetitive immersion of the polarizer film into the solution and emersion from the solvent or by a slow dipping motion into and out of the solvent.

In an advantageous embodiment of the method, the depth of immersion is reduced during the dipping step by more than 1 cm per 200 min, preferably the depth of immersion is reduced during the dipping step by more than 1 cm per 100 min, more preferably the depth of immersion is reduced during the dipping step by more than 1 cm per 60 min, and most preferably the depth of immersion is reduced during the dipping step by more than 1 cm per 30 min.

In another advantageous embodiment of the method, the depth of immersion is increased during the dipping step by more than 1 cm per 200 min, preferably the depth of immersion is increased during the dipping step by more than 1 cm per 100 min, more preferably the depth of immersion is increased during the dipping step by more than 1 cm per 60 min, and most preferably the depth of immersion is increased during the dipping step by more than 1 cm per 30 min.

The solvent may be moved relative to the blank or the polarizing film during the dipping step. In particular the solution is ultrasonically moved relative to the blank or the polarizing film during the dipping step. A homogeneous leach out of the dichroic dye occurs.

As already indicated above, it may be advantageous if the solvent comprises a reactive agent being capable of reacting with the polarizing agent. Neutralization of the polarizing effect occurs. As a reactive agent a hypochlorite, in particular calcium hypochlorite, may be used.

The method according to the disclosure may further comprise a casting step, namely after the dipping step the polarizing film or the blank may be cast into an eyewear such as a spectacle lens. Such eyewear, in particular the spectacle lens may have vision correcting properties or not.

BRIEF DESCRIPTION OF THE DRAWINGS

The disclosure will now be described with reference to the drawings wherein.

DESCRIPTION OF THE PREFERRED EMBODIMENTS OF THE INVENTION

Figure 1:
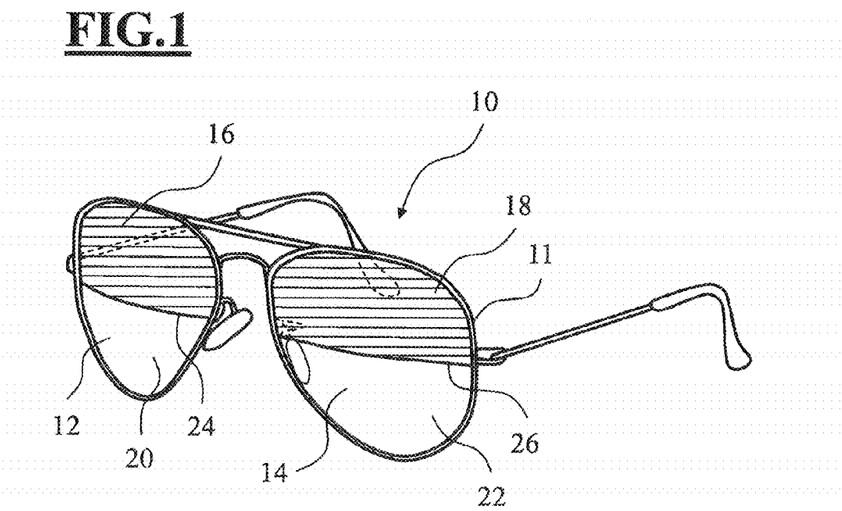
FIG. 1 shows a pair of sunglasses to be fabricated with a method according to the disclosure.

Referring now to FIG. 1, a pair of sunglasses 10 is shown having lenses 12 and 14 held in a frame 11, which are either coated with polarizing material or have polarized material embedded therein. The sunglasses 10 are provided with lenses 12 and 14 having upper polarized regions 16 and 18 as indicated by hachures and having lower non-polarized regions 20 and 22. The borderlines between the polarized regions 16 and 18 and the non-polarized regions 20 and 22 are indicated with reference numbers 24 and 26.

While viewing objects at a distance in the viewed scene, the wearer can obtain the beneficial results of polarized sunglasses, whereas by glancing down through the non-polarized portions the wearer can readily view instrumentation with polarized displays which otherwise might have been completely blacked out due to cross-polarization if the lower regions (20, 22) would be linearly polarized as well.

Figure 2:
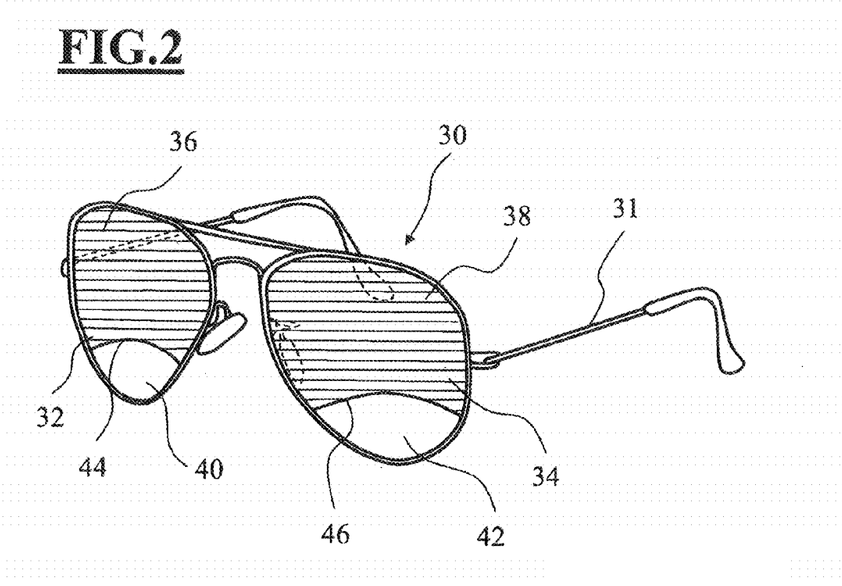
FIG. 2 shows another pair of sunglasses to be fabricated with a method according to the disclosure.

FIG. 2 shows a pair of sunglasses 30 with a frame 31 and with lenses 32 and 34 having upper polarizing regions 36 and 38 and having lower semi-circular non-polarizing regions 40 and 42 being separated by the quite sharp borderlines (44, 46) such that for viewing polarized displays one would look through the U-shaped or semi-circular non-polarized portions (40, 42) of the lenses.

In both cases the lenses themselves may be prescription lenses. In particular the lenses may also be multifocal, in particular bifocal or progressive, such as to provide presbyopic correction. If sunglasses are provided primarily for long distance viewing with one prescription or no prescription, the semi-circular regions (40, 42) may be provided with a different power, for instance to correct for presbyopic caused far-sightedness. The result is that the attenuation of polarized light in the far field is accomplished by viewing the scene through lens portions (36, 38), whereas polarized display viewing is accomplished by viewing the polarized display through the lower non-polarized portions (40, 42) of each lens (32, 34).

Figure 3:
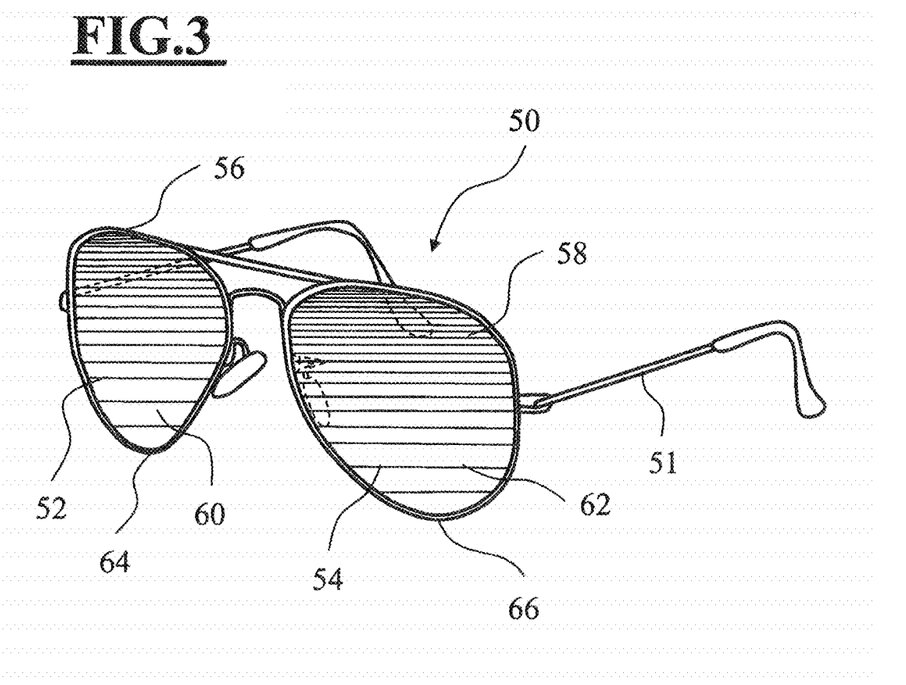
FIG. 3 shows still another pair of sunglasses to be fabricated with a method according to the disclosure.

Referring now to FIG. 3, a pair of sunglasses 50 is provided with a frame 51 and with lenses 52 and 54 having a gradient in the polarization applied. At the top (56, 58) of the lenses (52, 54) there is maximum polarization, which decreases continuously to the lower portion (60, 62) of each lens (52, 54) down to a non-polarized portion at the bottom (64, 66).

Figure 4:
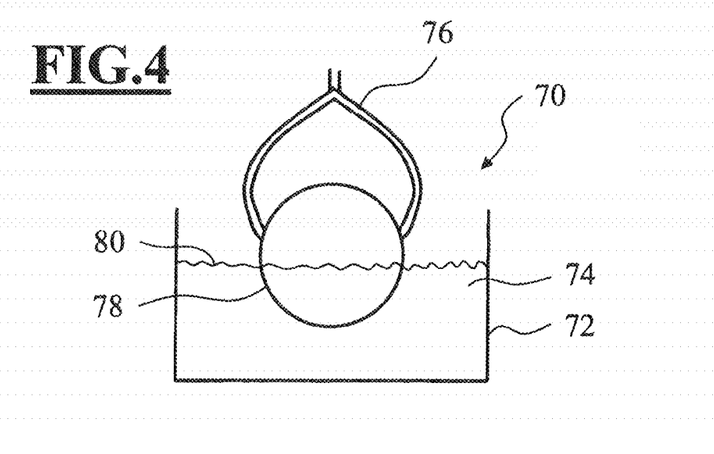
FIG. 4 shows an apparatus for fabricating a pair of sunglasses according to FIG. 1.

FIG. 4 shows an apparatus 70 for fabricating a pair of sunglasses 10 according to FIG. 1. The apparatus 70 comprises a tray 72 filled with solvent 74, such as, for example, water. The apparatus 70 further comprises a carrier 76 for a blank of the lens 12, 14 or a sheet 78 of a polarizing film.

In the method according to the disclosure, the sheet 78 (or the blank with a polarizing film laminated thereon) is dipped into the solvent 74 dissolving the polarizing agent, for example a dichroic dye from PVA as the dye-carrying substrate film, from the sheet 78 (or the polarizing film laminated on the blank). Since the surface 80 of the solvent 74 being exposed to ambient air provides a mainly straight borderline for the sheet 78 being exposed to the solvent 74 a quite linear borderline (24, 26) between the polarized regions 16, 18 and the non-polarized regions (20, 22) is generated.

Figure 5:
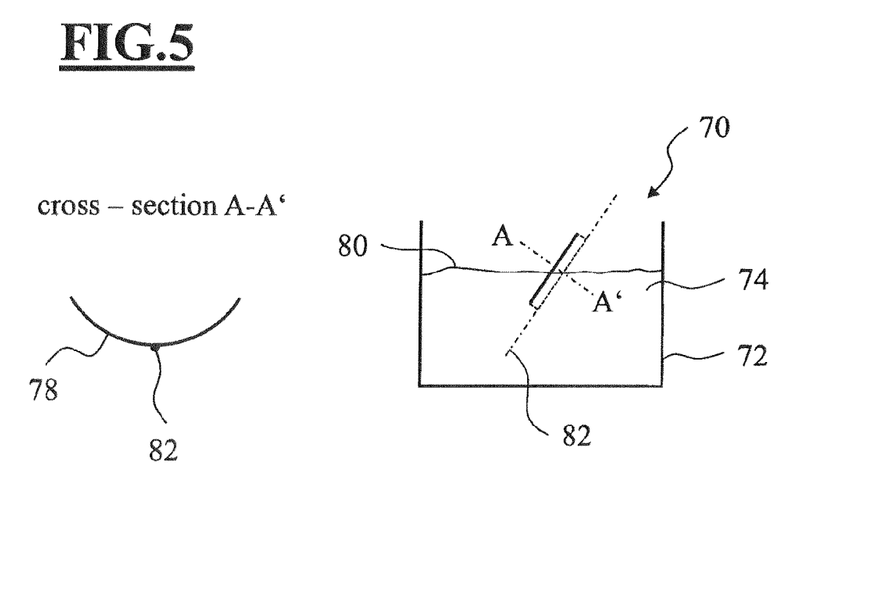
FIG. 5 shows a shape of a polarizing film for fabricating a pair of sunglasses according to FIG. 2 with the apparatus shown in FIG. 4.

FIG. 5 shows the apparatus 70 from a side view with a modified arrangement of the sheet 78 when dipping into the solvent 74. As can be seen in the cross-sectional view along the line A-A', the sheet 78 is bent along its axis 82 resulting in a transformation of the borderline between solvent-exposed regions and non-solvent-exposed regions of the sheet 78 into a circular shape. This modified arrangement therefore allows fabricating of sunglass lenses (32, 34) with a bent borderline (44, 46) separating polarized regions (36, 38) from non-polarized regions (40, 42).

Figure 6:
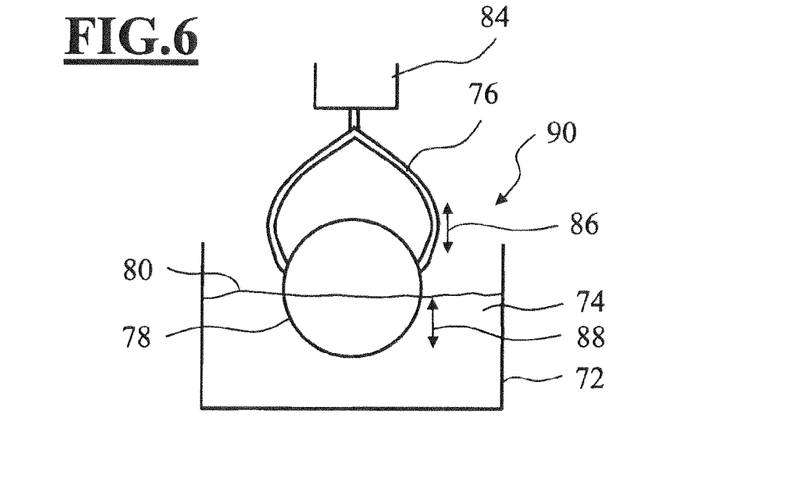
FIG. 6 is an apparatus for fabricating a pair of sunglasses according to FIG. 3.

FIG. 6 shows an apparatus 90 for fabricating a pair of sunglasses 50 according to FIG. 3. This apparatus 90 is very similar to the apparatus 70 shown in FIG. 4 and comprises a tray 72 filled with solvent 74, such as, for example, water. The apparatus 90 further comprises a carrier 76 for a blank of the lens (52, 54) or a sheet 78 of a polarizing film.

In addition to the components shown in FIG. 4, the apparatus 90 comprises a movement tool 84 for moving the carrier 76 with the blank or the sheet 78 up and down as indicated with the double arrow 86. The immersion depth 88 of the blank or the sheet 78 into the solvent 74 may therefore be varied during the dipping step resulting in a gradual leach out of the dichroic dye from the polarizing film, such as the sheet 78.

It is herewith pointed out that the figure schematically shows the carrier 76 holding the sheet 78 from the sides. However, in case of low structural integrity of the sheet 78, for example, as the case may be when using PVA, the carrier 76 can clasp the sheet 78 not from the sides of the film as shown but perpendicular to the plane of the film.

Figure 7:
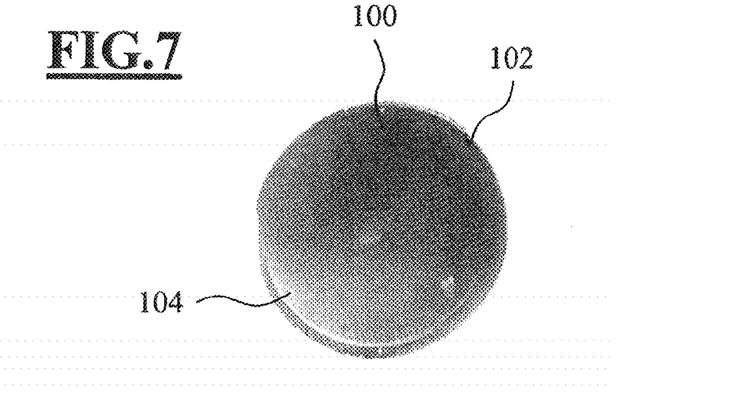
FIG. 7 is a photograph of a blank with a polarized film after treatment according to the disclosure on a polariscope.

As described in detail above, simply submerging a part of a blank comprising a polarizing film applied thereon will remove dichroic dyes. FIG. 7 shows a photograph of a blank 100 of an eyewear comprising polarized dye-type PVA as a polarizing film 102 applied thereon after dipping exposed to light from a polariscope. The film 102 has been dipped in water for 3+3 hours and rotated by 90 degrees at the 3 hour interval. The temperature was kept constant at 20° C. during dipping. The solvent 74 was stirred during dipping. The polarizing efficiency is partially destroyed in the lower portion 104 having been exposed to water as dyes leach out.

Figure 8:
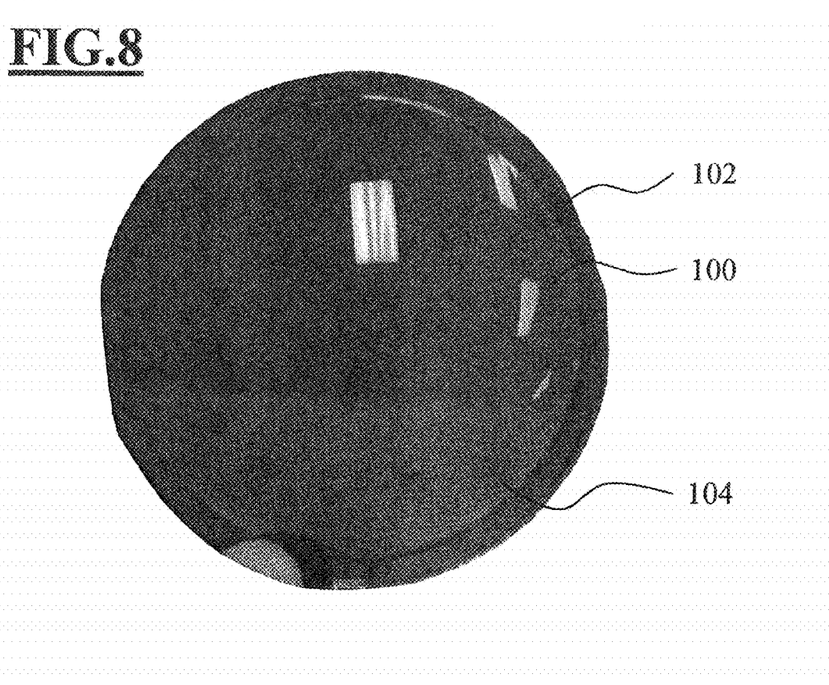
FIG. 8 is a photograph of a blank with a polarized film after treatment according to the disclosure viewed in ambient conditions; and, FIG. 9 is a photograph of a blank with a polarized film after excessive treatment in the solvent on a polariscope.

When the same blank 100 is viewed in ambient light conditions as shown in FIG. 8, a change in overall tint in the portion 104 can be seen.

Experiments have shown that the polarizing film is destroyed if left in the solvent, for example, water, too long. Also micro cracks can be seen to be forming on the polarizing film 102 subjected to 6 hours of dipping. It is suspected that this is due to plasticisers leaching out of the PVA to render it brittle. Therefore, there is a limitation to water exposure using the dipping technique.

Figure 9:
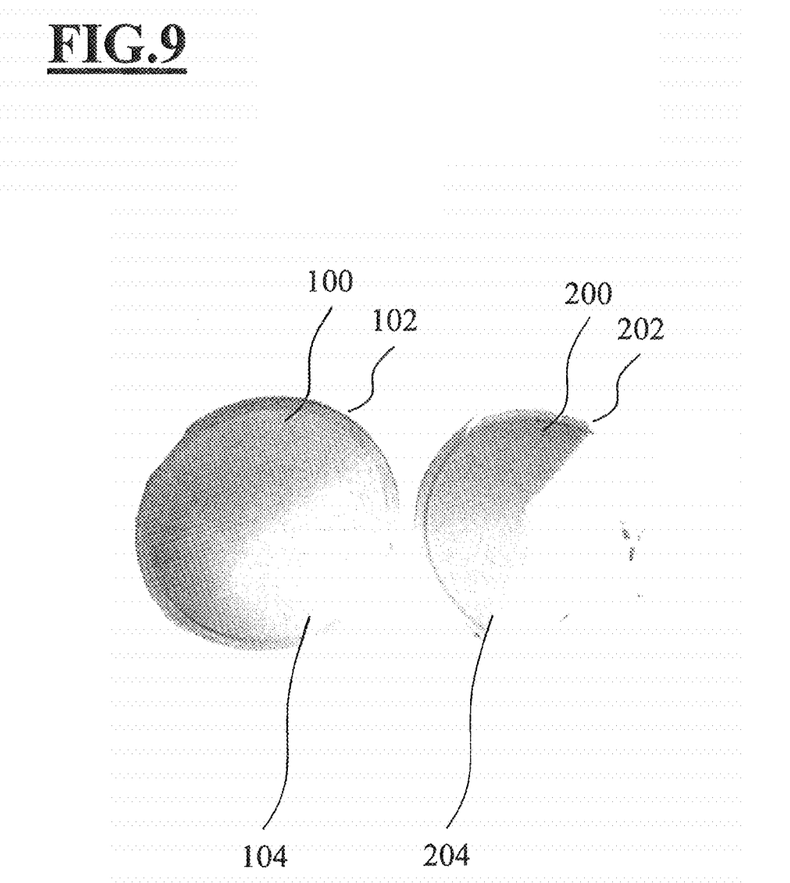

FIG. 9 shows a comparison of the views of the blank 100 described above with a blank 200 with the same polarizing film 202 but exposed to water for 17 hours, viewed with a polariscope. The lower portion 204 of the polarizing film 202 having been exposed to the solvent is completely clear however the film integrity is destroyed so there is a limit to bleaching if using just water.

It is understood that the foregoing description is that of the preferred embodiments of the invention and that various changes and modifications may be made thereto without departing from the spirit and scope of the invention as defined in the appended claims.

What is claimed is:

1. A method for producing polarized eyewear, comprising:
   providing a polarizing film or an eyewear blank having the polarizing film, wherein the polarizing film includes a substrate film and a polarizing agent;
   dipping the polarizing film or the blank having the polarizing film into a solvent; and,
   dissolving the polarizing agent from the polarizing film, wherein the polarizing film or the blank having the polarizing film is dipped into the solvent for a duration of from 30 minutes to 250 minutes and the temperature of the solvent is kept between 15° C. and 38° C.

2. The method according to claim 1, wherein the substrate film comprises at least one member from the group consisting of polyvinyl alcohol, a polyvinyl alcohol derivative, a polyene film obtained by dehydrochlorinating a polyvinyl chloride film, and a polyene film obtained by dehydrating a polyvinyl alcohol film.

3. The method according to claim 1, wherein the polarizing agent comprises iodine, a dichroic dye, or iodine and a dichroic dye.

4. The method according to claim 3, wherein the dichroic dye is selected from the group consisting of an azo-compound bearing the functional group R—N=N—R, in which R and R can be independently either aryl or alkyl; a naphtha-compound; an anthraquinone-compound; and a mixture thereof.

5. The method according to claim 1, wherein the solvent comprises a polar agent.

6. The method according to claim 5, wherein the polar agent is selected from the group consisting of water, an alcohol, acetone, and a mixture thereof.

7. The method according to claim 1, wherein the solvent comprises a non-polar agent.

8. The method according to claim 7, wherein the non-polar agent is selected from the group consisting of $C_nH_n$, $C_nH_{n+2}$, toluene, chloroform, diethyl ether, and a mixture thereof.

9. The method according to claim 1, wherein the temperature of the solvent is kept between 38° C. and 40° C. while the polarizing film or the blank having the polarizing film is dipped into the solvent.

10. The method according to claim 1, wherein the polarizing film or the blank having the polarizing film is dipped into the solvent for a duration of from 30 minutes to 150 minutes.

11. The method according to claim 1, wherein the polarizing film or the blank having the polarizing film is dipped into the solvent with a varying depth of immersion.

12. The method according to claim 11, wherein the depth of immersion is reduced by more than 1 cm per 200 minutes.

13. The method according to claim 11, wherein the depth of immersion is increased by more than 1 cm per 200 minutes.

14. The method according to claim 1, wherein the solvent is moved relative to the polarized film or the blank having the polarized film while the polarized film or the blank having the polarized film is dipped in the solvent.

15. The method according to claim 1, wherein the solvent comprises a reactive agent capable of reacting with the polarizing agent.

16. The method according to claim 1, further comprising:
casting the polarizing film or the blank having the polarizing film into a lens after dipping the polarizing film or the blank having the polarizing film into the solvent.

17. The method according to claim 1, wherein the temperature of the solvent is kept between 18° C. and 38° C.

18. The method according to claim 14, wherein the solvent is ultrasonically moved relative to the polarized film or the blank having the polarized film.

* * * * *